United States Patent Office 2,811,443
Patented Oct. 29, 1957

2,811,443

PHOTOGRAPHIC REPRODUCTION PROCESS USING LIGHT SENSITIVE POLYMERIC STILBAZOLES AND QUATERNARY SALTS THEREOF

Earl M. Robertson and Cornelius C. Unruh, Rochester, N. Y., assignors to Eastman Kodak Company, Rochester, N. Y., a corporation of New Jersey No Drawing. Application September 15, 1955, Serial No. 534,599

17 Claims. (Cl. 96—35)

This invention relates to a photographic reproduction process wherein polymeric C-vinylpyridine quaternary salts are employed as the light-sensitive material.

Continuous-tone, dyed images have been prepared previously from coatings of, for example, polyvinylcinnamate or anisalacetylpolystyrene on transparent base materials by exposing the coatings to a light source through the base in contact with a suitable image such as a silver or a dyed polymer image. The polymer coating was thus insolubilized by the action of the light to depths varying with the density of the continuous-tone negative. Those upper portions of the coating not affected by the light could then be dissolved away in organic solvents to leave an insoluble layer of varying thickness. By dyeing the residual polymer, a positive image was obtained whose densities varied with the relief thickness. However, these and other similar prior art light-sensitive polymers are sensitive principally in the ultraviolet region of the spectrum and, therefore, require arc light or other sources rich in ultraviolet emission, over a relatively long exposure, to give satisfactory insolubilizations. Since glass strongly absorbs ultraviolet radiations, the photographic applications of these materials have been limited almost entirely to nonglass exposure systems. Thus, direct camera exposures and enlargements have been out of the question for these materials. Also, in some cases it would be advantageous to incorporate an appropriate dye or pigment in the light-sensitive polymer composition, but the presence of these coloring agents would further retard the sensitivity of the compositions. In other words, prior art light-sensitive materials of this kind are altogether too slow for many conventional photographic processes.

While most of the light-sensitive polymers of the above kind are of the carbocyclic type, light-sensitive polymers containing heterocyclic nuclei are also known. For example, in copending application Serial No. 397,706, filed December 11, 1953, now abandoned, in the name of Jack L. R. Williams, there are described light-sensitive poly-N-vinylpyridine quaternary salts and aromatic aldehyde condensation products of those resins containing an active methyl group on the pyridyl nucleus. However, the resinous products, though of increased sensitivity as compared with the mentioned polyvinylcinnamate or anisalacetylpolystyrene materials are derived from polyvinyl sulfonates containing residual vinyl alcohol units and the reactions with aminopyridines to give the said intermediate polymers, which are then condensed with an aromatic aldehyde, are generally incomplete so that the resulting light-sensitive group containing polymers contain not only free amino groups and vinyl alcohol units, but also N-(C-amino) pyridyl-vinylamine units as well as residual unreacted vinyl sulfonate units in varying proportions. Reproducibility of uniform products and the obtaining of correspondingly good photographic results with these materials is therefore quite limited and where operable, difficult to accomplish satisfactorily. We have found that though these resinous products have good sensitivity to ultraviolet and lower wave lengths of the visible spectrum, they are still not sufficiently sensitive for certain applications as, for example, for enlargements, for camera exposures, etc. where a glass optical system is essential.

We have now found that certain polymeric C-vinylpyridine quaternary salts are particularly suitable as light-senstive materials for reproduction processes, because they are sensitive not only in the ultraviolet region of the spectrum, but are also highly sensitive up to the orange-red region of the visible spectrum, i. e. from about 3000 A. to 6400 A. Coatings on suitable supports such as clear cellulose ester sheets or other clear synthetic polymer sheets, opaque sheet materials, such as paper, aluminum, zinc, etc. of these sensitive materials are, therefore, sufficiently sensitive to visible energy to permit image exposures either through the base or on the sensitive side, depending on the support, by even daylight or by tungsten light. Thus, color separation images through suitable separation filters can be made directly from color transparencies by contact or projection in a glass optical system or from life in a camera. Also, we have found, that these light-sensititive materials allow considerable dye or pigment concentration in the unexposed polymer coating without seriously retarding the speed of the coating. Another advantage is that coatings from many of these light-sensitive polymers have good affinity for water and may, if desired, be prepared by coating from and developing in aqueous media, instead of employing the less convenient organic solvents. We have found further that our developed images mordant acid dyes while swelled with the developer without special consideration given to the solvent action of the dye bath or the drying down of the image before dyeing as with most organic solvent systems. Any colored acid dye may be employed. However, certain of the polymeric C-vinylpyridine quaternary salts of the invention are colored polymers and can form the visible image, without resorting to a separate dyeing operation. With the selection of appropriate color groups, full color reproductions can be made by superimposing exposed presensitized sheets of the proper colors. Both yellow and red images are readily obtainable without separate dyeing.

It is, accordingly, an object of the invention to provide the art with a light-sensitive element that is sensitive not only to ultraviolet radiations, but especially sensitive to almost all of the visible spectrum, and which element is capable of very wide application in direct photography and in photomechanical reproductions. Another object is to provide a photographic reproduction process employing the said element. Other objects will become apparent hereinafter.

The polymeric C-vinylpyridine quaternary salts employed in our reproduction process may be represented by one or other of the following recurring structural units:

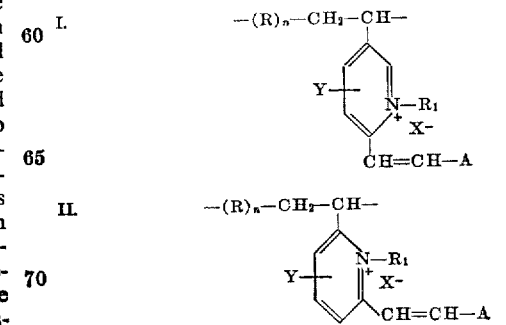

I.

II.

III. 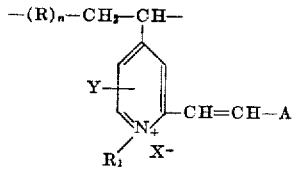

wherein $n$ represents a digit of from 0 to 50, or higher, i. e. the recurring structural unit may represent a homopolymer or a copolymer wherein the molar ratios are up to 1:50 of the vinylpyridyl group to the comonomer group R, Y represents a hydrogen atom or an alkyl group containing from 1 to 2 carbon atoms i. e. a methyl or ethyl group, $R_1$ represents an alkyl group containing from 1 to 6 carbon atoms, e. g. methyl, ethyl, propyl, isopropyl, hexyl, etc. groups, X represents an anion such as an alkylsulfonic acid radical containing from 1 to 6 carbon atoms or an arylsulfonic acid radical containing from 6 to 7 carbon atoms (i. e. an alkyl or arylsulfonate anion) e. g. a methanesulfonate anion, a butanesulfonate anion, a benzenesulfonate anion, a p-toluenesulfonate anion, etc., an alkylsulfuric acid radical containing from 1 to 6 carbon atoms (i. e. an alkylsulfate anion) e. g. a methylsulfate anion, an ethylsulfate anion, a butylsulfate anion, a hexylsulfate anion, etc., a halide anion, e. g. an iodide anion, a chloride anion, a bromide anion or other acid radical (anion), for example, a perchlorate anion, etc., R represents a comonomer unit such as derived from an ethylenically unsaturated, polymerizable monomer containing the basic aliphatic —CH=C< group, for example, such as unreacted C-vinylpyridine quaternary salt units or ethylene, isobutylene, 1,3-butadiene, etc. units, a vinyl ester unit containing from 2 to 7 carbon atoms in the ester radical, e. g. vinyl actate, vinyl butyrate, vinyl benzoate, etc. units, a corresponding isopropenyl ester unit, a styrene, alkylstyrene or chlorostyrene unit, an alkyl acrylate or methacrylate unit, a vinyl alkyl ether unit, a vinyl alkyl ketone unit, an acrylic amide unit such as acrylamide, methacrylamide, N-alkyl and N,N-dialkyl-acrylamide and methacrylamide, etc. units, a vinyl or vinylidene chloride unit, a vinyl pyridine or quaternized vinyl pyridine unit, and the like units, wherein in each instance the said alkyl group contains from 1 to 4 carbon atoms, and A represents a heterocyclic group, for example, a furyl group or a carbocyclic group of from 6 to 14 carbon atoms such as a phenyl, naphthyl or anthryl nucleus which may or may not be substituted by at least one monovalent substituent, but more specifically A may be represented by the following general structure:

IV. 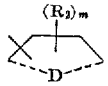

wherein $m$ represents a digit of from 1 to 2, $R_2$ represents a hydrogen atom or a monovalent substituent such as a halogen atom, chlorine or bromine, a methylene dioxy group, a cyano group, a nitro group, an alkyl group of from 1 to 4 carbon atoms, an alkoxy group of from 1 to 4 carbon atoms, e.g. methoxy, ethoxy, butoxy, etc. groups, a hydroxyl group, an acetamido group, a —COOR$_3$ group wherein R$_3$ represents a hydrogen atom, an alkyl group of from 1 to 4 carbon atoms or an alkali metal atom, e. g. sodium or potassium, an —SO$_3$R$_3$ group wherein R$_3$ is as above and an

group wherein $R_4$ represents an alkyl group of from 1 to 4 carbon atoms, and D represents the atoms necessary to complete a phenyl nucleus, a naphthyl nucleus or an anthryl nucleus. The light-senstive products wherein D represents the atoms necessary to complete a phenyl nucleus are preferred.

The above-defined polymeric vinylpyridine quaternary salts may be prepared by several methods. For example, they can be prepared by starting with a monomeric C-vinylpyridine containing a methyl group ortho or para to the heterocyclic nitrogen atom and advantageously subjecting the said compound to simultaneous quaternization and polymerization, followed by condensation with the desired aromatic aldehyde. However, the light-sensitive polymers utilized in our invention may also be prepared by first preparing the monomeric C-vinylpyridine quaternary salt, polymerizing this to the resinous polymer and then condensing with the aromatic aldehyde, or a less preferable method is to first polymerize the C-vinylpyridine, then quaternize the resulting polymer, followed by condensation with the aromatic aldehyde. As previously mentioned, a comonomer designated R may also be present in the above reactions thereby producing the corresponding light-sensitive copolymeric vinylpyridine quaternary salt compounds. Those prepared with benzaldehyde or substituted benzaldehydes may properly be termed "stilbazole" derivatives. Further details for preparing the described light-sensitive polymers employed in our invention may be had by reference to copending application Serial No. 534,598, of G. W. Leubner et al., filed of even date herewith, wherein the said polymers are described and claimed.

The following table shows sensitometric data for several of the preferred polymers which we employ in the practice of our invention.

TABLE

| Polymer | Coating Solution | | Sensitivity of Coating | | |
|---|---|---|---|---|---|
| | Solvent | Conc. of Polymer, Percent by Weight | Spectral sensitivity, mμ | Factor | |
| | | | | Through Glass | Through Plexiglas |
| Poly-4' methoxy-1-methyl-5-vinyl-2-stilbazolium methosulfate. | 2-methoxy-ethanol | 2.0 | 310-490 | 1,300 | 45 |
| Poly-1-methyl-5-vinyl-2-stilbazolium methosulfate. | 10% ethanol, 90% water | 0.75 | 300-420 | 3,500 | 90 |
| Poly-4'-dimethyl-amino-1-methyl-5-vinyl-2-stilbazolium methosulfate. | 50% ethanol, 50% water | 1.0 | 300-640 | 2,200 | 50 |
| Do | do | 0.5 | 300-640 | 7,000 | 250 |
| Do | methanol | 1.0 | 300-640 | 1,400 | 35 |
| Do | do | 0.5 | 300-640 | 2,800 | 65 |
| Do | do | 2.5 | 300-640 | 200 | 5 |

The table lists the polymer employed, the coating solution of the specified polymer and the sensitivity of the coatings made therefrom. These coatings are made on a paper base and their thicknesses depend largely on the concentration of the polymer in the coating solution. To determine the sensitivity of the coated paper samples, each sample is divided into several strips, one of which is used for determining the spectral sensitivity by exposure in a spectrograph, and another of which is exposed beneath a density step wedge through ¼-inch clear, colorless glass and the other of which is similarly exposed through ¼-inch Plexiglas (polymethyl methacrylate sheet). The strips are then developed in a solvent which leaves in each instance insolubilized polymer in proportion to the exposure, and after dyeing or inking the developed strips by a standard procedure, the densities of the step wedge step producing the last visible insolubilized, dyed polymer step in each instance is read and the relative speed calculated. It will be seen that listed polymers show a spectral sensitivity in the relatively wide range of from 300 m$\mu$ to 640 m$\mu$. The overall sensitivity is shown in terms of a speed factor in the last two columns of the table, e. g., from 200 to 7000 through glass and from 5 to 250 through Plexiglas (a clear, colorless sheet of a thermoplastic acrylic polymer resin) as compared with that of 1.0 for unsensitized polyvinyl cinnamate strips exposed under exactly the same conditions and processed in an appropriate organic solvent. These data indicate a considerable improvement in speed for our elements over the prior art as represented by polyvinyl cinnamate photographic elements. While the polymers shown in the table are essentially homopolymers of the corresponding monomers, it will be understood that some variation in the sensitivity may be introduced by employing polymers which in their preparation have been incompletely condensed with the aromatic aldehyde so that not every pyridyl nucleus contains the grouping —CH=CH—A. Also, as previously indicated the polymer need not be a homopolymer, since certain copolymers are likewise operable. In general, any dilution with non-sensitive groups though altering certain physical properties such as solubility, toughness, mordanting power, etc. results in a lower speed factor.

The following examples will serve further to illustrate the new photographic elements and their applications in photographic reproduction processes.

*Example 1.—Continuous-tone print exposed with tungsten light source*

A polymer dope was prepared by dissolving 1 gram of poly-4'-dimethylamino-1-methyl-5-vinyl-2-stilbazolium methosulfate in 100 cc. of methanol containing about 0.25 cc. of ethylene glycol.

The clear solution was poured into a 5- by 5-inch sheet of 0.003-inch thick cellulose acetate film base while whirling horizontally at 78 R. P. M. Excess dope was thrown off the edges leaving a uniform, transparent polymer coating to dry in forced warm air.

The coating was exposed through the base in contact with a conventional, silver, continuous-tone negative and step wedge in a glass-covered pressure printing frame. The exposure was two minutes at a distance of four inches from a 100-watt, frosted tungsten bulb with no reflector. (Exposures with a similar polymer was as short as one minute at 12 inches from the 100-watt bulb.) Development was for 30 seconds in a tray of 1% hydrochloric acid.

While swelled with developer, the developed polymer image was immersed in a dye bath consisting of 2 grams of an acid black dye (color index No. 246) in 100 cc. of water for about 15 seconds. Excess dye was rinsed off under cold tap water leaving a continuous-tone dyed polymer image reproducing about twelve steps of the 0.15 density step wedge of a 1.8 log E exposure latitude.

By varying the composition of the above polymer, i. e. preparing similar polymers which, however, are incompletely reacted with the p-dimethylaminobenzaldehyde so that variable proportions of original unreacted 1,2-dimethyl-5-vinylpyridinium methosulfate groups are present with the formed light-sensitive 4'-dimethylamino-1-methyl-5-vinyl-2-stilbazolium methosulfate groups, it is possible to obtain polymers of varying solubilities and this, together with varying the concentration of ethylene glycol, makes possible the carrying out of the development of the image also in various other common solvents, for example, in ethanol, in cold tap water, in hot tap water or in mixtures of these. In general, the solubility of the polymer is greater in water the larger the proportion of unreacted 1,2-dimethyl-5-vinylpyridinium methosulfate groups in the polymer.

Also, by adjusting the coating thickness and/or the exposure and/or the dye bath concentration, continuous-tone images may be prepared with the above type of polymers for viewing either by transmitted light, or by reflected light by applying a suitable white, opaque backing such as a white pigmented lacquer.

In place of the poly-4'-dimethylamino-1-methyl-5-vinyl-2-stilbazolium methosulfate, there may be substituted in above Example 1 any other of the light-sensitive polymers which were previously mentioned as being suitable, for example, poly-1-methyl-5-vinyl-2-stilbazolium methosulfate, or poly-4'-methoxy-1-methyl-5-vinyl-2-stilbazolium methosulfate, or poly-2'-chloro-1-methyl-5-vinyl-2-stilbazolium methosulfate, or poly-4'-methoxy-1-methyl-6-vinyl-2-stilbazolium methosulfate, etc., or corresponding other quaternary salts of these polymers having either a methyl-p-toluenesulfonate anion, an alkylsulfate anion such as a methylsulfate anion, an alkylsulfonate anion such as a methanesulfonate anion, or an iodide, chloride or bromide anion, or a perchlorate anion etc., to give generally similar continuous-tone dyed polymer images.

*Example 2.—Image by projection in an enlarger*

Poly-4'-dimethylamino-1-methyl-5-vinyl-2-stilbazolium methosulfate was dissolved in the proportions of 0.5 grams of the polymer per 100 cc. in a 1:1 methanol-water mixture. After filtering the resulting dope, it was whirl-coated in the manner described in Example 1 on a cellulose acetate sheet. Exposure was made through the base on the easel of an enlarger for 5 minutes at f 4.5 to obtain an enlargement of the subject of three diameters with a 2-inch focal length lens. The exposed polymer sheet was developed for one minute in a tray of 1:1 methanol-water mixture, dyed in an aqueous 2% solution of an acid type black dye, and then rinsed with tap water to remove the excess dye. An excellent enlarged reproduction was thus obtained.

In place of the poly-4'-dimethylamino-1-methyl-5-vinyl-2-stilbazolium methosulfate, there may be substituted in the above example any other of the light-sensitive polymers which were previously mentioned as being suitable, for example, poly-1-methyl-5-vinyl-2-stilbazolium methosulfate, or poly-4'-methoxy-1-methyl-5-vinyl-2-stilbazolium methosulfate, or poly-2'-chloro-1-methyl-5-vinyl-2-stilbazolium methosulfate, or poly-4'-methoxy-1-methyl-6-vinyl-2-stilbazolium methosulfate, etc., or corresponding other quaternary salts of these polymers having either a methyl-p-toluenesulfonate anion, an alkylsulfate anion such as a methylsulfate anion, an alkylsulfonate anion such as a methanesulfonate anion, or an iodide, chloride or bromide anion, or a perchlorate anion, etc., to give generally similar enlarged reproductions.

*Example 3.—Continuous-tone image exposed in a camera using tungsten light*

A polymer dope consisting of 0.5 gm. of poly-4'-dimethylamino-1-methyl-5-vinyl-2-stilbazolium methosulfate dissolved in 80 cc. of methanol and containing 0.25 cc. of ethylene glycol was whirl-coated onto cellulose acetate film base at 78 R. P. M. until dry.

Exposure was made in a camera through the film base using two 500 watt photoflood lamps mounted at 45° and about 18 inches from a continuous-tone photographic print. An auxiliary portrait lens was used over the camera lens. The exposure duration was five minutes at f 3.5.

The exposed coating was developed in 1% hydrochloric acid solution for approximately one minute and then dyed in a 2% aqueous solution of an acid type of black dye. A rinse in tap water washed away excess dye. A distinguishable negative reproduction of the photographic print resulted.

In place of the poly-4'-dimethylamino-1-methyl-5-vinyl-2-stilbazolium methosulfate, there may be substituted in the above example any other of the light-sensitive polymers which were previously mentioned as being suitable, for example, poly-1-methyl-5-vinyl-2-stilbazolium methosulfate, or poly-4'-methoxy-1-methyl-5-vinyl-2-stilbazolium methosulfate, or poly-2'-chloro-1-methyl-5-vinyl-2-stilbazolium methosulfate, or poly-4'-methoxy-1-methyl-5-vinyl-2-stilbazolium methosulfate, etc., or corresponding other quaternary salts of these polymers having either a methyl-p-toluenesulfonate anion, an alkylsulfate anion such as a methylsulfate anion, an alkylsulfonate anion such as a methanesulfonate anion, or an iodide, chloride or bromide anion, or a perchlorate anion, etc., to give generally similar negative reproductions of photographic prints.

*Example 4.—Contrast control by use of color filters*

Coatings of poly-4'-dimethylamino-1-methyl-5-vinyl-2-stilbazolium methosulfate from methanol solution on clear, cellulose acetate film base were exposed through the base in a pressure printing frame in contact with a 0.15 step wedge and three color separation filters. In each instance exposure was for 4 minutes at 12 inches from a 500-watt photoflood light. The exposed coatings were developed in 1% aqueous hydrochloric acid solution and dyed in a 2% aqueous solution of an acid type black dye.

The densities of the resulting images of the step wedges were read on a densitometer by transmission and the slope of the plotted curve was determined approximately. The results found are as follows:

| Filter | Contrast (Slope of Density-vs.-log Exposure Curve) |
| --- | --- |
| No filter | 1.70 |
| Blue 47B | 0.90 |
| Green 58 | 1.70 |
| Red 25 | 1.50 |

In the above tabulation, the filter designated as 25 corresponds to Kodak Wratten A filter (No. 25); the filter designated 47B corresponds to Kodak Wratten C5 filter (No. 47); and the filter identified as 58 corresponds to Kodak Wratten B filter (No. 58). These are described in "Kodak Data Book—Filters and Pola-screens," copyrighted 1944, by the Eastman Kodak Co. The above results indicate that effective contrast control is obtainable by the use of appropriate color filters.

Other of the mentioned light-sensitive polymers may be substituted for the poly-4'-dimethylamino-1-methyl-5-vinyl-2-stilbazolium methosulfate in the above example such as, for example, poly-1-methyl-5-vinyl-2-stilbazolium methosulfate, or poly-4'-methoxy-1-methyl-5-vinyl-2-stilbazolium methosulfate, or poly-2'-chloro-1-methyl-5-vinyl-2-stilbazolium methosulfate, or poly-4'-methoxy-1-methyl-6-vinyl-2-stilbazolium methosulfate, etc., or any of the above polymers wherein there are also present some pyridyl nuclei having no —CH=CH—A group thereon, for example, a substantial proportion of 1,2-dimethyl-5-vinylpyridinium methosulfate, or 1,2-dimethyl-6-vinylpyridinium methosulfate, etc. groups, or any of the above polymers wherein the anion is a methyl-p-toluenesulfonate anion, an alkylsulfate anion such as a methylsulfate anion, an alkylsulfonate anion such as a methanesulfonate anion, a chloride, bromide or iodide anion, a perchlorate anion, etc., to give generally similar images of variable contrast.

*Example 5.—Photosensitive carrier for pigments*

25 cc. of a 2.5% poly-4'-dimethylamino-1-methyl-5-vinyl-2-stilbazolium methosulfate dope in methanol solution were shaken with one gram of zinc ortho silicate phosphor. While the phosphor pigment was suspended, the dope was whirl-coated at 78 R. P. M. onto cellulose acetate film base and allowed to dry.

Exposure was made through the base in contact with a line photographic negative in a pressure printing frame for 20 seconds at a distance of 12 inches from a 500-watt photoflood tungsten bulb. The exposed image was developed in a tray of 1% aqueous hydrochloric acid solution for 30—60 seconds and was then dried. A positive, insoluble, polymeric image resulted which contained trapped phosphor pigment.

Proof of the presence of sufficient phosphor was made by exciting it with 254 mu radiation from a monochromator. A brilliant green phosphorescent image was produced.

In place of the poly-4'-dimethylamino-1-methyl-5-vinyl-2-stilbazolium methosulfate, there may be substituted in the above example any other of the light-sensitive polymers which were previously mentioned as being suitable, for example, poly-1-methyl-5-vinyl-2-stilbazolium methosulfate, or poly-4'-methoxy-1-methyl-5-vinyl-2-stilbazolium methosulfate, or poly-2'-chloro-1-methyl-5-vinyl-2-stilbazolium methosulfate, or poly-4'-methoxy-1-methyl-6-vinyl-2-stilbazolium methosulfate, etc., or corresponding other quaternary salts of these polymers having either a methyl-p-toluenesulfonate anion, an alkylsulfate anion such as a methylsulfate anion, an alkylsulfonate anion such as a methane sulfonate anion, or an iodide, chloride or bromide anion, or a perchlorate anion, etc., to give generally similar phosphorescent images.

In the preceding examples, our reproduction process has been illustrated with elements wherein the light-sensitive polymer was coated onto a transparent support such as a clear cellulose ester sheet, the exposures being made through the support material. However, all of the advantages of speed, visible sensitivity and aqueous processing carry over with these polymers to processes employing opaque bases such as metals, paper, etc., where exposure must be done on the sensitive coating side of the base. While this restriction makes impossible the wash-off relief type of image to obtain continuous tones in polymer coatings, it does give many tone gradations on polymer coatings by exposing from the top and following with ordinary processing and dyeing. Processes requiring line and halftone image exposures are handled by higher-contrast polymer coatings exposed from the top, with contrast control in the coating thickness or with added dyes or pigments. Of particular interest are processes involving the said light-sensitive polymers either as resist images against the action of chemical etchants or those in which the polymers are carriers for a pigment, dye or phosphor. The polymers have also shown sufficient resistance to ferric chloride to be considered as photo-resist materials for producing etched copper electrical circuits on plastic board. Photoengravings and etched-and-filled nameplates are also products that can be made from these polymers, depending upon the resistance to the individual etching solution. The following examples illustrate some of the above-mentioned materials and just how our reproduction process is applied thereto.

*Example 6.—Images exposed through color-separation filters*

A 1% dope of poly-4'-dimethylamino-1-methyl-5-vinyl-2-stilbazolium methosulfate in methanol was whirl-coated at 78 R. P. M. onto a grained aluminum support. Spectrograms were prepared while exposing through conventional Wratten gelatin separation color filters in a wide aperture spectrograph employing a xenon type, 1000-watt, high pressure arc source. Development was for 30 seconds in methanol, followed by a dip in an aqueous solution of an acid type of black dye. In each case, the polymer was insolubilized in a different spectral area corresponding to the transmission of the filter used. The results are shown below.

| Filter Color | Number | Exposure | Spectral Range Recorded mu |
|---|---|---|---|
| None | | 5 minutes/1 mm. slit | 300-620 |
| Blue | 47B | 10 minutes/1 mm. slit | 390-480 |
| Green | 58 | 10 minutes/1 mm. slit | 490-570 |
| Red | 25 | 60 minutes/1 mm. slit | 590-620 |
| Red | 25 | 17 minutes/3 mm. slit | 590-620 |

In the above tabulation, the filters are the same as those identified in above Example 4.

In place of the poly-4'-dimethylamino-1-methyl-5-vinyl-2-stilbazolium methosulfate, there may be substituted in the above example any other of the light-sensitive polymers which were previously mentioned as being suitable, for example, poly-1-methyl-5-vinyl-2-stilbazolium methosulfate, or poly - 4' - methoxy - 1 - methyl-5-vinyl-2-stilbazolium methosulfate, or poly-2'-chloro-1-methyl-5-vinyl-2-stilbazolium methosulfate, or poly-4'-methoxy - 1 - methyl-6-vinyl-2-stilbazolium methosulfate, etc., or corresponding other quaternary salts of these polymers having either a methyl-p-toluenesulfonate anion, an alkylsulfate anion such as a methylsulfate anion, an alkylsulfonate anion such as a methanesulfonate anion, or an iodide, chloride or bromide anion, or perchlorate anion, etc., to give generally similar images through color-separation filters in the above recorded spectral ranges.

*Example 7.—Photo resist for ferric chloride*

A 1% solution of poly-4'-dimethylamino-1-methyl-5-vinyl-2-stilbazolium methosulfate in methanol was flow-coated onto a clean copper surface and drained dry. The plate was then exposed in contact with a line, photographic positive in a vacuum frame for 8 minutes at a distance of three feet from a 35-amp. white-flame carbon arc. (Exposures on copper are well-known to be much longer than those required for non-absorbing metal surfaces. For example, a comparable exposure on bright magnesium was 10 seconds.) The exposed coating was developed in hot tap water and dyed while swelled with water in a 2% aqueous solution of an acid type of black dye. A cold water rinse carried away excess dye.

The plate was then baked at 500° F. for five minutes to rid the polymer of residual water. It was then etched for thirty minutes in a tray of 42° Bé. ferric chloride to a depth of approximately 0.0015 inch. The resistance demonstrated by this test was sufficient for preparing etched circuits.

In place of the poly-4'-dimethylamino-1-methyl-5-2-stilbazolium methosulfate, there may be substituted in the above example any other of the light-sensitive polymers which were previously mentioned as being suitable, for example, poly-1-methyl-5-vinyl-2-stilbazolium methosulfate, or poly - 4' - methoxy-1-methyl-5-vinyl-2-stilbazolium methosulfate, or poly-2'-chloro-1-methyl-5-vinyl-2 - stilbazolium methosulfate, or poly - 4' - methoxy-1-methyl-6-vinyl-2-stilbazolium methosulfate, etc., or corresponding other quaternary salts of these polymers having either a methyl-p-toluenesulfonate anion, an alkylsulfate anion such as a methylsulfate anion, an alkylsulfonate anion such as a methanesulfonate anion, or an iodide, chloride or bromide anion, or a perchlorate anion, etc., to give generally similar photoresists.

While the foregoing examples show only a limited number of the mentioned light-sensitive polymers, it will be understood that other members coming within the defined class of suitable polymers are likewise operable in our invention, for example, the various copolymers are essentially modified homopolymers which are also operative, but which have modified light-sensitive and physical properties. Related photo reproduction processes are suggested by these examples. Thus, the compositions of the invention may be employed as pigment carriers which can be simply exposed and processed to produce dot sequential phosphor patterns for color television picture tubes, or as pigmented or dyed photosensitive media for preparing large-sized photo templates, for example, in the aircraft industry, which are characterized by high photographic speed and simplicity of aqueous processing.

What we claim is:

1. A photographic reproduction process which comprises exposing a supported layer of a light sensitive polymer selected from the group consisting of a C-vinylpyridine quaternary salt polymer consisting essentially of the recurring structural unit:

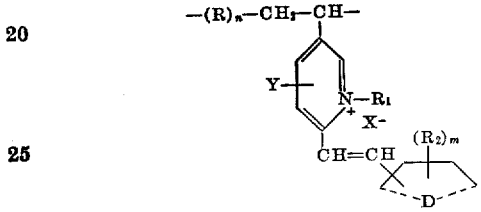

a C-vinylpyridine quaternary salt polymer consisting essentially of the recurring structural unit:

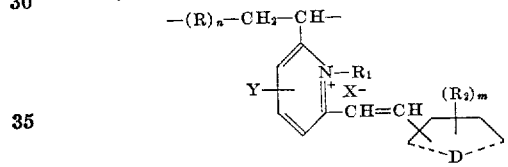

and a C-vinylpyridine quaternary salt polymer consisting essentially of the recurring structural unit:

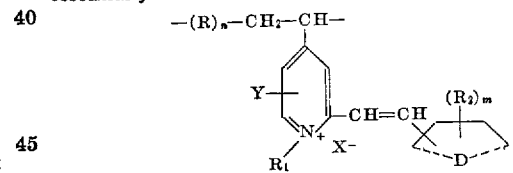

wherein $n$ represents a digit of from 0 to 50, $m$ represents a digit of from 1 to 2, Y represents a member selected from the group consisting of a hydrogen atom and an alkyl group containing from 1 to 2 carbon atoms, R represents a comonomer unit derived from an ethylenically unsaturated, polymerizable monomer containing an aliphatic

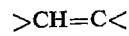

group, $R_1$ represents an alkyl group containing from 1 to 6 carbon atoms, X represents an anion selected from the group consisting of an alkyl sulfate anion containing from 1 to 6 carbon atoms, an alkyl sulfonate anion containing from 1 to 6 carbon atoms, an aryl sulfonate anion containing from 6 to 7 carbon atoms, a perchlorate anion and a halide anion, $R_2$ represents a member selected from the group consisting of a hydrogen atom, a halogen atom, a methylene dioxy group, an alkyl group containing from 1 to 4 carbon atoms, an alkoxy group containing from 1 to 4 carbon atoms, an acetamido group, a —COOR$_3$ group wherein R$_3$ represents a member selected from the group consisting of a hydrogen atom, an alkyl group containing from 1 to 4 carbon atoms and an alkali metal atom, an —SO$_3$R$_3$ group wherein R$_3$ is as above, and an

group wherein R₄ represents an alkyl group containing from 1 to 4 carbon atoms, and D represents the atoms necessary to complete a carbocyclic nucleus containing from 6 to 14 carbon atoms in the said nucleus, until an insoluble image has been obtained in the exposed region and then dissolving away the polymer from only the unexposed region of the layer, thereby obtaining a supported layer of said insoluble polymer image.

2. A photographic reproduction process which comprises exposing a supported layer of a light-sensitive C-vinylpyridine quaternary salt polymer consisting essentially of the recurring structural unit:

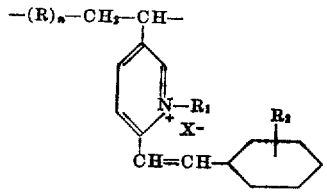

wherein $n$ represents a digit from 0 to 50, R represents a comonomer unit derived from an ethylenically unsaturated, polymerizable monomer containing an aliphatic $$>CH=C<$$

group, $R_1$ represents an alkyl group containing from 1 to 6 carbon atoms, X represents an alkylsulfate anion containing from 1 to 6 carbon atoms, and $R_2$ represents an alkoxy group containing from 1 to 6 carbon atoms, until an insoluble polymer image has been obtained in the exposed region and then dissolving away the polymer from only the unexposed region of the layer, thereby obtaining a supported layer of said insoluble polymer image.

3. A photographic reproductioin process which comprises exposing a supported layer of a light sensitive C-vinylpyridine quaternary salt polymer consisting essentially of the recurring structural unit:

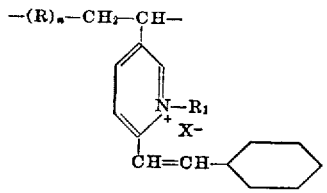

wherein $n$ represents a digit from 0 to 50, R represents a comonomer unit derived from an ethylenically unsaturated, polymerizable monomer containing an aliphatic $$>CH=C<$$

group, $R_1$ represents an alkyl group containing from 1 to 6 carbon atoms, X represents an alkylsulfate anion containing from 1 to 6 carbon atoms, until an insoluble polymer image has been obtained in the exposed region and then dissolving away the polymer from only the unexposed region of the layer, thereby obtaining a supported layer of said insoluble polymer image.

4. A photographic reproduction process which comprises exposing a supported layer of a light-sensitive C-vinylpyridine quaternary salt polymer consisting essentially of the recurring structural unit:

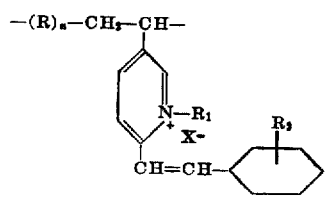

wherein $n$ represents a digit from 0 to 50, R represents a comonomer unit derived from an ethylenically unsaturated, polymerizable monomer containing an aliphatic $$>CH=C<$$

group, $R_1$ represents an alkyl group containing from 1 to 6 carbon atoms, X represents an alkylsulfate anion containing from 1 to 6 carbon atoms and $R_2$ represents a dialkylamino group wherein each of said alkyl groups contain from 1 to 4 carbon atoms, until an insoluble polymer image has been obtained in the exposed region and then dissolving away the polymer from only the unexposed region of the layer, thereby obtaining a supported layer of said insoluble polymer image.

5. A photographic reproduction process which comprises exposing a supported layer of a light-sensitive C-vinylpyridine quaternary salt polymer consisting essentially of the recurring structural unit:

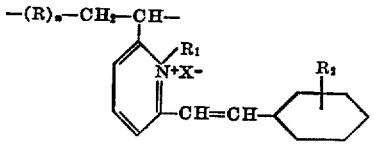

wherein $n$ represents a digit from 0 to 50, R represents a comonomer unit derived from an ethylenically unsaturated, polymerizable monomer containing an aliphatic $$>CH=C<$$

group, $R_1$ represents an alkyl group containing from 1 to 6 carbon atoms, X represents an alkylsulfate anion containing from 1 to 6 carbon atoms, and $R_2$ represents an alkoxy group containing from 1 to 4 carbon atoms, until an insoluble polymer image has been obtained in the exposed region and then dissolving away the polymer from only the unexposed region of the layer, thereby obtaining a supported layer of said insoluble polymer image.

6. A photographic reproduction process which comprises exposing a supported layer of a light-sensitive C-vinylpyridine quaternary salt polymer consisting essentially of the recurring structural unit:

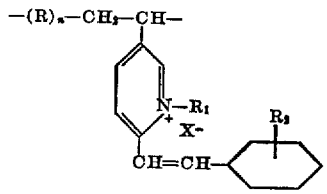

wherein $n$ represents a digit from 0 to 50, R represents a comonomer unit derived from an ethylenically unsaturated, polymerizable monomer containing an aliphatic $$>CH=C<$$

group, $R_1$ represents an alkyl group containing from 1 to 6 carbon atoms, X represents an arylsulfonate anion containing from 6 to 7 carbon atoms, and $R_2$ represents an alkoxy group containing from 1 to 4 carbon atoms, until an insoluble polymer image has been obtained in the exposed region and then dissolving away the polymer from only the unexposed region of the layer, thereby obtaining a supported layer of said insoluble polymer image.

7. A photographic reproduction process which comprises exposing a supported layer of a light-sensitive polymer consisting essentially of the recurring structural unit, 4′-methoxy-1-methyl-5-vinyl-2-stilbazolium methosulfate, until an insoluble polymer image has been obtained in the exposed region and then dissolving away the polymer from only the unexposed region of the said layer, thereby obtaining a supported layer of said insoluble polymer image.

8. A photographic reproduction process which comprises exposing a supported layer of a light-sensitive polymer consisting essentially of the recurring structural unit, 1-methyl-5-vinyl-2-stilbazolium methosulfate, until an insoluble polymer image has been obtained in the exposed region and then dissolving away the polymer from only the the unexposed region of the said layer, thereby obtaining a supported layer of said insoluble polymer image.

9. A photographic reproduction process which comprises exposing a supported layer of a light-sensitive polymer consisting essentially of the recurring structural unit, 4'-dimethylamino-1-methyl-5-vinyl-2-stilbazolium methosulfate, until an insoluble polymer image has been obtained in the exposed region and the dissolving away the polymer from only the unexposed region of the said layer, thereby obtaining a supported layer of said insoluble polymer image.

10. A photographic reproduction process which comprises exposing a supported layer of a light-sensitive polymer consisting essentially of the recurring structural unit, 4'-methoxy-1-methyl-6-vinyl-2-stilbazolium methosulate, until an insoluble polymer image has been obtained in the exposed region and then dissolving away the polymer from only the unexposed region of the said layer, thereby obtaining a supported layer of said insoluble polymer image.

11. A photographic reproduction process which comprises exposing a supported layer of a light-sensitive polymer consisting essentially of the recurring structural unit, 4'-methoxy-1-methyl-5-vinyl-2-stilbazolium methosulfate, until an insoluble polymer image has been obtained in the exposed region and then dissolving away the polymer from only the unexposed region of the said layer, thereby obtaining a supported layer of said insoluble polymer image.

12. The process of claim 11 wherein the said supported layer of said insoluble polymer image is subjected to a dyeing process.

13. The process of claim 7 wherein the said supported layer of said insoluble polymer image is subjected to a dyeing process.

14. The process of claim 8 wherein the said supported layer of said insoluble polymer image is subjected to a dyeing process.

15. The process of claim 9 wherein the said supported layer of said insoluble polymer image is subjected to a dyeing process.

16. The process of claim 10 wherein the said supported layer of said insoluble polymer image is subjected to a dyeing process.

17. The process of claim 11 wherein the said supported layer of said insoluble polymer image is subjected to a dyeing process.

References Cited in the file of this patent

UNITED STATES PATENTS

| | | |
|---|---|---|
| 2,540,985 | Jackson | Feb. 6, 1951 |
| 2,690,966 | Minsk et al. | Oct. 5, 1954 |
| 2,701,243 | Reynolds et al. | Feb. 1, 1955 |

UNITED STATES PATENT OFFICE

CERTIFICATE OF CORRECTION

Patent No. 2,811,443                                October 29, 1957

Earl M. Robertson et al.

It is hereby certified that error appears in the printed specification of the above numbered patent requiring correction and that the said Letters Patent should read as corrected below.

Column 14, line 1, claim 12, for the claim reference numeral "11" read --1--.

Signed and sealed this 14th day of January 1958.

(SEAL)
Attest:

KARL H. AXLINE
Attesting Officer

ROBERT C. WATSON
Commissioner of Patents